US008682164B2

(12) United States Patent
Tien et al.

(10) Patent No.: US 8,682,164 B2
(45) Date of Patent: Mar. 25, 2014

(54) OPTICAL WAVELENGTH DIVISION NODE

(75) Inventors: Po-Lung Tien, Hsinchu (TW); Maria C. Yuang, Hsinchu (TW); Hsing-Yu Chen, Hsinchu (TW); Jyehong Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 2 days.

(21) Appl. No.: 13/427,591

(22) Filed: Mar. 22, 2012

(65) Prior Publication Data
US 2013/0129355 A1 May 23, 2013

(30) Foreign Application Priority Data

Nov. 17, 2011 (TW) .............................. 100141980 A

(51) Int. Cl.
*H04J 14/00* (2006.01)
(52) U.S. Cl.
USPC ................... 398/72; 398/66; 398/70; 398/71; 398/79
(58) Field of Classification Search
USPC ................ 398/66–72, 79, 82, 85, 87, 93, 135
See application file for complete search history.

(56) References Cited

U.S. PATENT DOCUMENTS

| 6,870,991 | B2* | 3/2005 | Ohta et al. ....................... 385/50 |
| 7,330,656 | B2* | 2/2008 | Lee et al. ........................ 398/78 |
| 7,359,637 | B2* | 4/2008 | Kim et al. ....................... 398/72 |
| 8,131,156 | B2* | 3/2012 | Yu .................................. 398/168 |
| 8,270,833 | B2* | 9/2012 | Lin et al. ........................ 398/72 |
| 8,391,716 | B2* | 3/2013 | Chen et al. ...................... 398/72 |
| 8,406,620 | B2* | 3/2013 | Khermosh et al. .............. 398/16 |
| 8,488,977 | B2* | 7/2013 | Kim et al. ....................... 398/175 |
| 2001/0046352 | A1 | 11/2001 | Ohta et al. |
| 2006/0140631 | A1* | 6/2006 | Brolin ............................. 398/79 |

(Continued)

FOREIGN PATENT DOCUMENTS

TW 201003272 A 1/2010
TW 201036360 A 10/2010

OTHER PUBLICATIONS

F. Payoux et al. "Demonstration of a RSOA-based Wavelength Remodulation Scheme in 1.25 Gbit/s Bidirectional Hybrid WDM-TDM PON" *OFC Journal*, 2006, (3) pages.
J. Prat et al., "Wavelength shifting for colorless ONUs in single-fiber WDM-PONs" *OFC Journal*, 2007, (3) pages.

(Continued)

*Primary Examiner* — Daniel Washburn
*Assistant Examiner* — Hibret Woldekidan
(74) *Attorney, Agent, or Firm* — Muncy, Geissler, Olds & Lowe, P.C.

(57) ABSTRACT

An optical wavelength division node includes an optical splitter, a plurality of optical circulators, and a colorless light source module. The optical splitter receives and splits a downstream signal light source into a first-path and a second-path signal light source. The optical circulator in a first-order position receives and transmits the first-path signal light source to an optical network unit in a first-order position, and receives a return signal and passes it to a next optical circulator, and finally the optical circulator in a last-order position receives the return signal and transmits it. The colorless light source module receives the second-path signal light source and the return signal transmitted by the optical circulator in a last-order position, and uses the second-path signal light source to modulate the return signal to generate an upstream signal light source to be transmitted to the optical line terminal by the optical splitter.

7 Claims, 4 Drawing Sheets

(56) References Cited

U.S. PATENT DOCUMENTS

| | | |
|---|---|---|
| 2009/0097852 A1 | 4/2009 | Qian et al. |
| 2010/0215368 A1 | 8/2010 | Qian et al. |
| 2010/0239253 A1* | 9/2010 | Lin et al. .................. 398/63 |
| 2010/0316378 A1* | 12/2010 | Yeh et al. .................. 398/58 |
| 2011/0135314 A1* | 6/2011 | Tolstikhin et al. ......... 398/149 |

OTHER PUBLICATIONS

C. H. Wang et al., "Rayleigh Noise Mitigation Using Single-Sideband Modulation Generated by a Dual-Parallel MZM for Carrier Distributed PON" *IEEE Photonics Technology Letters*, vol. 22, No. 11, Jun. 1, 2010, pp. 820-822.

* cited by examiner

OPTICAL WAVELENGTH DIVISION NODE

TECHNICAL FIELD

The disclosure relates to a device using a signal light source transmission technique, and more particularly, to an optical wavelength division node applicable to an Optical Line Terminal (OLT) and a plurality of Optical Network Units (ONUs).

BACKGROUND

Orthogonal Frequency Division Multiple Access-Passive Optical Network (OFDMA-PON) is a signal transmission technique that increases transmission rate and saves cost. It employs high-order Quadrature Amplitude Modulations (QAMs) in conjunction with OFDM signals to transmit signals with high transmission capacity using low-bandwidth elements. For example, an element with a 10 GHz bandwidth may transmit signals at 40 Gbps. However, the limitation of this technique is that high-order QAMs will be inevitably accompanied by higher signal to noise ratios (SNR), so higher received power is needed to support such modulations.

Frequency Division Multiple Access (FDMA) allows users to achieve multiple accesses during transmission by using different frequencies. That is, each Optical Network Unit (ONU) distinguishes frequency band used, so that ONUs can transmit data simultaneously. However, in the case that FDMA is used under a general tree-like architecture, sending of upstream signals may be accompanied by Optical Beat Interference (OBI). In addition, among different ONUs, if carriers with the same wavelength are used without temperature control, then severe interference may occur. Thus, when FDMA is used in a general tree-like architecture, a wavelength division multiplexing (WDM) laser is required to transmit upstream signals. However, the WDM laser equipment significantly increases the cost of signal transmission. Furthermore, in order to maintain accurate wavelengths, the WDM laser has to be further temperature controlled, and cannot be moved with the ONUs.

U.S. patent application No. 20090097852 discloses an OFDMA-PON technique, which sends upstream signals by Frequency Division Multiplexing (FDM). However, in this technique disclosed by said publication, if the same wavelength is used to transmit upstream signals, OBI may still occur in the Optical Line Terminal (OLT). In order to eliminate OBI, this publication still requires the use of a WDM laser when transmitting upstream signals. Using the WDM laser again leads to the increase of cost and lack of flexibility in usage for the ONUs.

U.S. patent application No. 20100215368 addresses the problems of OBI and the use of WDM laser by employing a colorless application scheme. More specifically, this publication puts the laser sources needed by the ONUs on the OLT side, so that lasers are transmitted to the ONUs along with the signals, and then an optical filter, an optical amplifier and a special optical modulator are used to achieve colorless optical sources. However, the use of the optical filter, the optical amplifier and the special optical modulator greatly increase the cost of the ONUs, and is thus more difficult to implement.

Therefore, there is a great need to solve the problems of the prior art.

SUMMARY

In accordance with the above and other objectives, the disclosure provides an optical wavelength division node connected and provided between an optical line terminal (OLT) and a plurality of optical network unit (ONU), comprising: an optical splitter for receiving a downstream signal light source with a single wavelength transmitted by the OLT and splitting the received downstream signal light source into a first-path signal light source and a second-path signal light source; a plurality of optical circulators sequentially and individually connected to each of the plurality of ONUs, wherein the optical circulator in a first-order position receives the first-path signal light source transmitted by the optical splitter and transmits the first-path signal light source received from the optical splitter to the ONU in a first-order position, so as to receive a return signal transmitted by the ONU in a first-order position and pass the return signal received from the ONU in a first-order position to the optical circulator in a second-order position, until the optical circulator in a last-order position receives the return signal transmitted by the ONU in a last-order position and transmits the return signal received from the optical circulator in a last-order position; and a colorless light source module for receiving the second-path signal light source transmitted by the optical splitter and the return signal transmitted by the optical circulator in a last-order position, and using the second-path signal light source to modulate the return signal received from the optical circulator in a last-order position to generate an upstream signal light source to be then transmitted back to the OLT by the optical splitter.

In accordance with the above and other objectives, the disclosure also provides an optical wavelength division node connected and provided between an optical line terminal (OLT) and a plurality of optical network unit (ONU), comprising: a filter for receiving a downstream signal light source and a signal-free light source with different wavelengths transmitted by the OLT, and separately transmitting the received downstream signal light source and the signal-free light source received from the OLT; a plurality of optical circulators sequentially and individually connected to each of the plurality of ONUs, wherein the optical circulator in a first-order position receives the downstream signal light source transmitted by the filter and transmits the downstream signal light source received from the filter to the ONU in a first-order position, so as to receive a return signal transmitted by the ONU in a first-order position, and pass the return signal received from the ONU in a first-order position to the optical circulator in a second-order position, until the optical circulator in a last-order position receives the return signal transmitted by the ONU in a last-order position, and transmits the return signal received from the optical circulator in a last-order position; and a colorless light source module for receiving the signal-free light source transmitted by the filter and the return signal transmitted by the optical circulator in a last-order position, and using the signal-free light source to modulate the return signal received from the optical circulator in a last-order position to generate an upstream signal light source to be then transmitted back to the OLT by the filter.

BRIEF DESCRIPTION OF DRAWINGS

The disclosure can be more fully understood by reading the following detailed description of the preferred embodiments, with reference made to the accompanying drawings, wherein.

DETAILED DESCRIPTION OF EMBODIMENTS

The disclosure is described by the following specific embodiments. Those with ordinary skill in the arts can readily understand the other advantages and functions of the disclosure after reading the disclosure of this specification. The disclosure can also be implemented with different embodiments. Various details described in this specification can be modified based on different viewpoints and applications without departing from the scope of the disclosure.

In the light of forgoing drawbacks, a main objective of the disclosure is to provide a signal light source transmission technique that maintains the cost of the ONUs while eliminating optical beat interference. Compared to the prior art, the optical wavelength division node of the disclosure includes the colorless light source module, the plurality of optical circulators, and the optical splitter that operate in coordination, or the colorless light source module, the plurality of optical circulators, and the filter that operate in coordination. As a result, regardless of whether the received signals are of a single wavelength or different wavelengths, the optical wavelength division node of the disclosure can effectively solve the technical limitations imposed by the existing WDM scheme. Moreover, the colorless light source technique can be used without increasing the cost of the ONUs.

Figure 1:
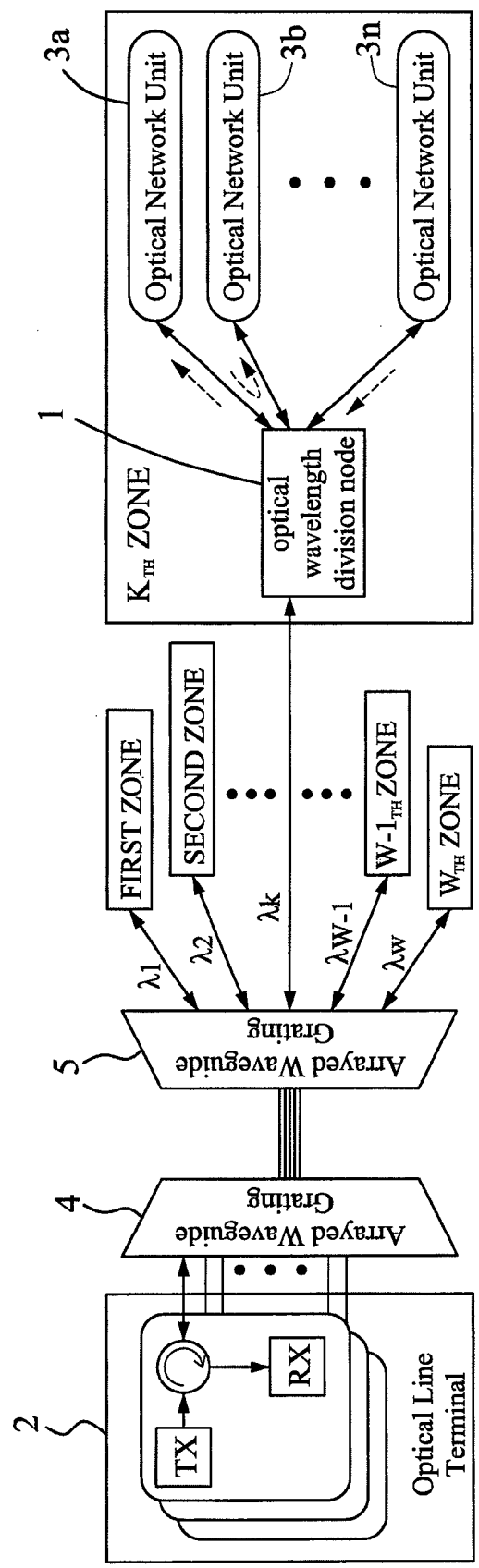
FIG. 1 is a schematic diagram showing the application of an optical wavelength division node of the disclosure.
Figure 2:
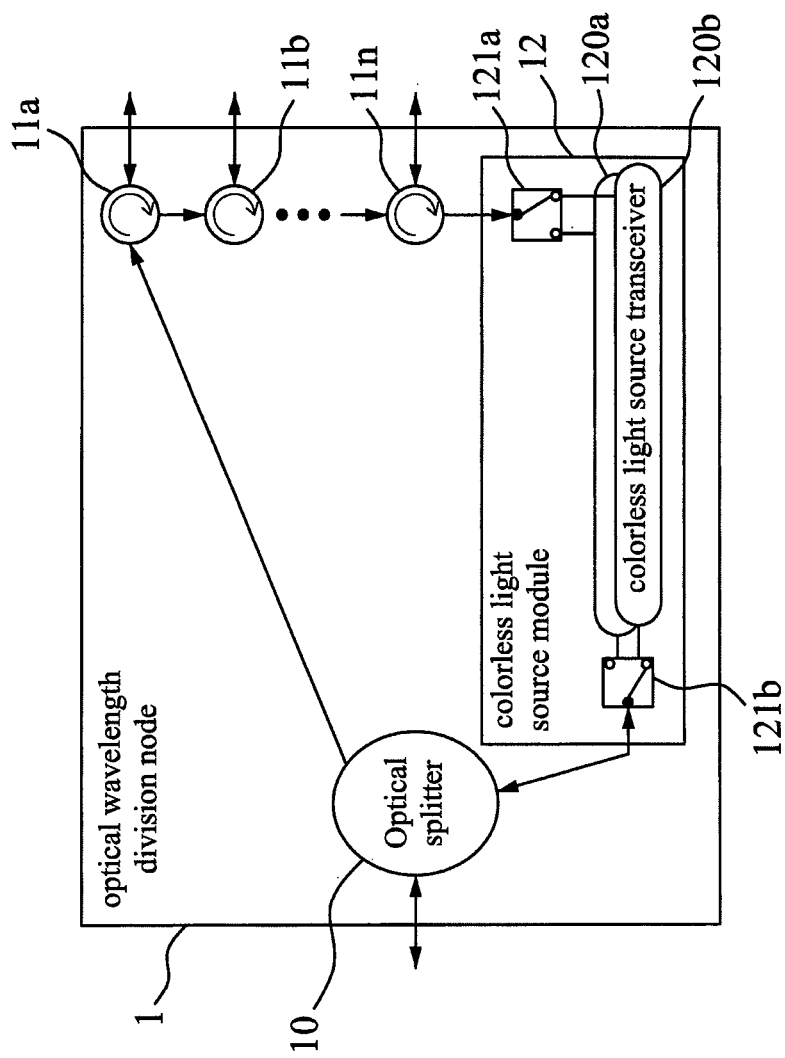
FIG. 2 is a schematic diagram depicting the structure of the optical wavelength division node of the disclosure.

A first embodiment of an optical wavelength division node provided by the disclosure can be understood by referring to both FIGS. 1 and 2. FIG. 1 is a schematic diagram showing the application of the optical wavelength division node of the disclosure. FIG. 2 is a schematic diagram depicting the structure of the optical wavelength division node of the disclosure.

As shown, the optical wavelength division node 1 is connected between an Optical Line Terminal (OLT) 2 and a plurality of Optical Network Units (ONUs) 3a-3n, including an optical splitter 10, a plurality of optical circulators 11a~11n, and a colorless light source module 12. More specifically, the OLT 2 performs light source transmission and reception via Arrayed Waveguide Gratings (AWGs) 4 and 5 and the optical wavelength division node 1. In the architecture shown in FIG. 1, a first zone, a second zone, a $K_{th}$ zone, a $W-1_{th}$ zone and a $W_{th}$ zone can each be provided with an optical wavelength division node 1 and a plurality of the ONUs 3a-3n. Different zones employ different light source wavelengths for transmission and reception.

The optical splitter 10 receives downstream signal light source with a single wavelength transmitted by the OLT 2 via the AWGs 4 and 5, and splits the received downstream signal light source into a first-path signal light source and a second-path signal light source for subsequent transmission. In this embodiment, the optical splitter 10 is designed as a 1-to-2 optical splitter.

The plurality of optical circulators 11a-11n are connected to the plurality of ONUs 3a~3n, respectively, wherein the first-placed optical circulator 11a in a first-order position receives the first-path signal light source transmitted by the optical splitter 10, and then transmits the first-path signal light source received from the optical splitter 10 to the first-placed ONU 3a in a first-order position, and after the first-placed ONU 3a has finished processing, receives a return signal transmitted by the first-placed ONU 3a, and then passes the return signal received from the first-placed ONU 3a to the optical circulator 11b in a next place in a second-order position to the first-placed optical circulator 11a, and on the process is sequentially repeated. Finally, the last-placed optical circulator 11n in a last-order position receives the return signal transmitted by the last-placed ONU 3n in a last-order position, and then transmits the return signal received from the last-placed optical circulator 11n. In order to simplify descriptions, details implementations of the above transmissions can be found in TW patent application No. 099142524 and will not be further discussed herein.

The colorless light source module 12 receives the second-path signal light source transmitted by the optical splitter 10 and the return signal transmitted by the last-placed optical circulator 11n, and uses the second-path signal light source received from the optical splitter 10 to modulate the return signal received from the last-placed optical circulator 11n to generate an upstream signal light source. The upstream signal light source is then transmitted back to the OLT 2 by the optical splitter 10 optionally via the AWGs 4 and 5.

In this embodiment, the colorless light source module 12 includes at least two Colorless Light source Transceivers (CLTs) 120a and 120b, a first switch 121a connected with the CLT 120a and 120b and the last-placed optical circulator 11n, and a second switch 121b connected with the CLT 120a and 120b and the optical splitter 10. With such a design, when one of the CLTs fails, it can switch to the other normal CLT, increasing system reliability.

Figure 4:
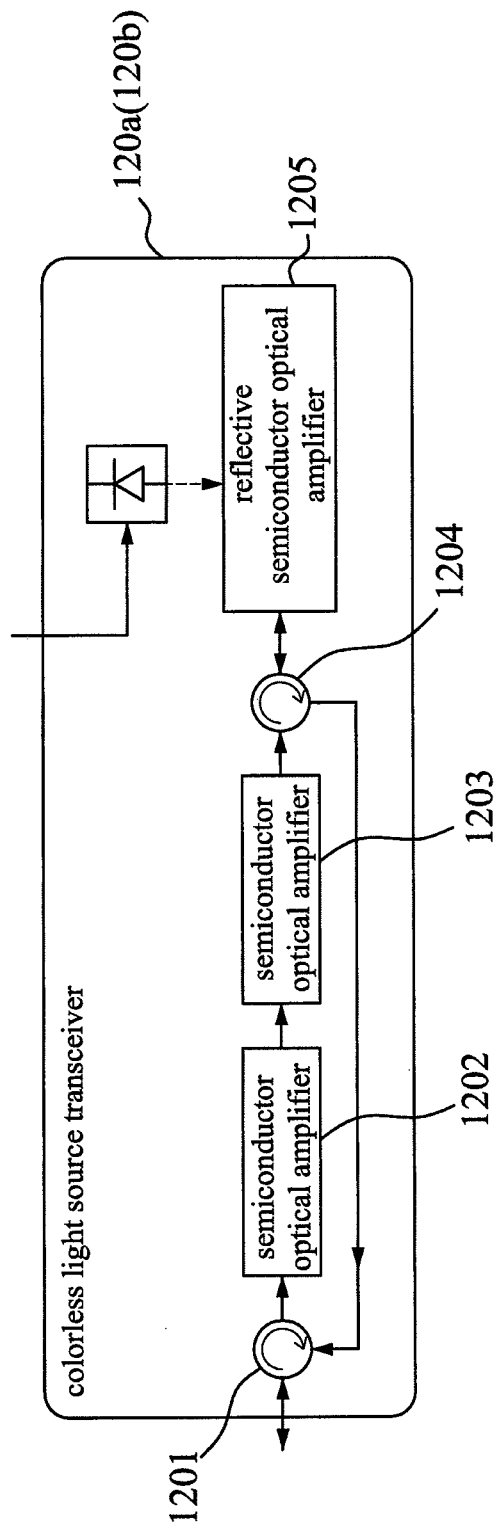
FIG. 4 is a schematic diagram depicting the structure of a colorless light source transceiver of the disclosure.

Furthermore, as shown in FIG. 4, the CLTs 120a and 120b may each include two Semiconductor Optical Amplifiers (SOAs) 1202 and 1203, a first optical circulator 1201 connected with and provided between an input end of the SOA 1202 and the second switch 121b, a second optical circulator 1204 connected with an output end of the SOA 1203, and a Reflective Semiconductor Optical Amplifiers (RSOA) 1205 connected and provided between the second optical circulator 1204 and the first switch 121a. The second optical circulator 1204 is further connected to the first optical circulator 1201. Such an arrangement can therefore carry out the predetermined processing and modulation.

Comparing prior art with the technique provided in the disclosure, ONUs employing the traditional wavelength division multiplexing (WDM) technique has to be designed as the expensive colorless ONUs, whereas the plurality of ONUs in the disclosure do not need to be constructed as colorless light sources, and an optical wavelength division node 1 is used instead for integral processing. This not only reduces implementation cost, but also increases implementation flexibility. Meanwhile, since a plurality of ONUs in the same zone may share a single light source in the disclosure, the frequency division multiple access (FDMA) scheme can be used without the limitation of optical beat interference.

It should be noted that the above embodiment uses the downstream light source for modulation, in the case that the downstream light source cannot completely eliminate carried signals (interference), noise may occur in the upstream light source. Thus, in another embodiment of the disclosure, when transmitting the downstream light source, an additional light source with no carried signals can also be provided for subsequent modulation. This embodiment is different from the previous embodiment in that the wavelength of the light source received by the optical wavelength division node 1 from the OLT 2 will be doubled.

Figure 3:
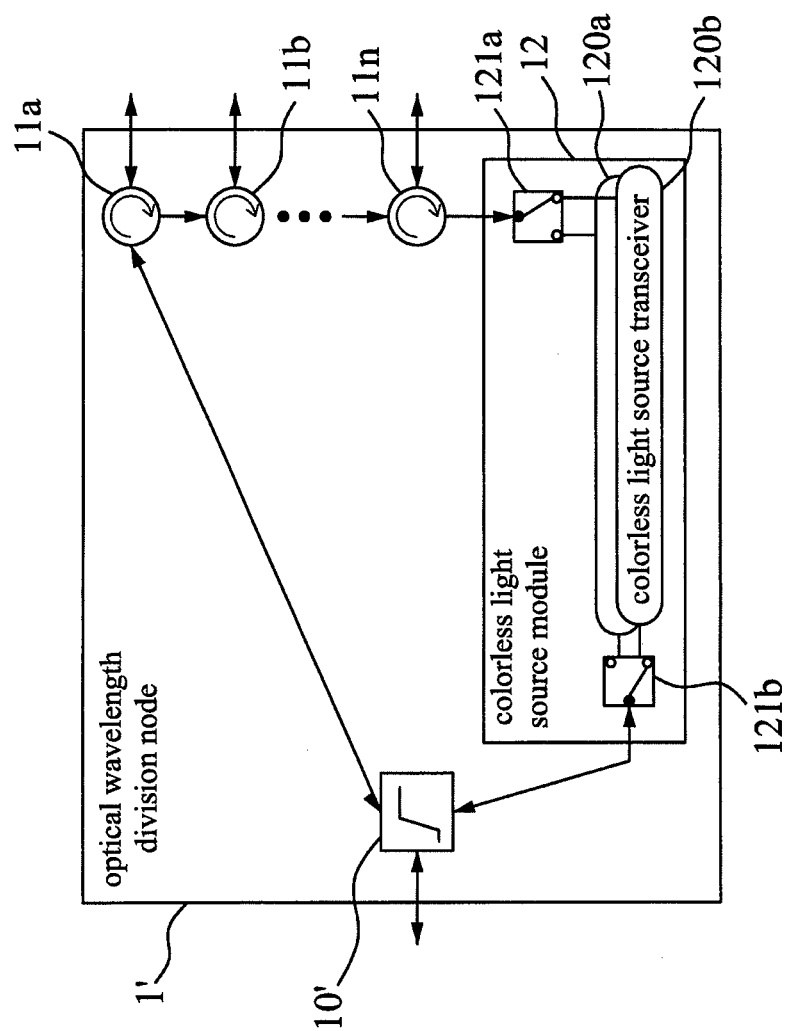
FIG. 3 is a schematic diagram depicting another structure of the optical wavelength division node of the disclosure.

More specifically, in this embodiment, the design of the optical wavelength division node 1 can be modified to an optical wavelength division node 1' shown in FIG. 3. In this diagram, the optical wavelength division node 1' includes a filter 10', a plurality of optical circulators 11a-11n, and a colorless light source module 12.

The filter 10' receives a downstream signal light source and a signal-free light source with different wavelengths transmitted by the OLT 2, and separately transmits the downstream signal light source and the signal-free light source. Of course, the OLT 2 may perform transmission through the AWGs 4 and 5.

Similarly, the plurality of optical circulators 11a-11n are connected to the plurality of ONUs 3a-3n, respectively, wherein the first-placed optical circulator 11a receives the downstream signal light source transmitted by the filter 10', and then transmits the downstream signal light source received from the filter 10' to the first-placed ONU 3a, and after the first-placed ONU 3a has finished processing, receives a return signal transmitted by the first-placed ONU 3a, and then passes the return signal received from the first-placed ONU 3a to an optical circulator 11b in a next place to the first-placed optical circulator 11a, and the process is sequentially repeated. Finally, the last-placed optical circulator 11n receives the return signal transmitted by the last-placed ONU 3n, and then transmits the return signal received from the last-placed optical circulator 11n.

The colorless light source module 12 receives the signal-free light source transmitted by the filter 10' and the return signal transmitted by the last-placed optical circulator 11n, and uses this signal-free light source received from the filter 10' to modulate the return signal received from the last-placed optical circulator 11n to generate an upstream signal light source. The upstream signal light source is then similarly transmitted back to the OLT 2 by the filter 10' via the AWGs 4 and 5. In this embodiment, the design of colorless light source module 12 is the same as that in the previous embodiment, and thus will not be further described.

In summary, the optical wavelength division node of the disclosure includes the colorless light source module, the plurality of optical circulators, and the optical splitter that operate in coordination, or the colorless light source module, the plurality of optical circulators, and the filter that operate in coordination. As a result, regardless of whether the received downstream light sources are of a single wavelength or different wavelengths, the optical wavelength division node of the disclosure can effectively solve the technical limitations imposed by the existing WDM scheme. Moreover, the colorless light source technique can be used without increasing the cost of the ONUs.

The above embodiments are only used to illustrate the principles of the disclosure, and they should not be construed as to limit the disclosure in any way. The above embodiments can be modified by those with ordinary skill in the art without departing from the scope of the disclosure as defined in the following appended claims.

What is claimed is:

1. An optical wavelength division node connected with and provided between an optical line terminal (OLT) and a plurality of optical network unit (ONU), comprising:
    an optical splitter for receiving a downstream signal light source with a single wavelength transmitted by the OLT and splitting the received downstream signal light source into a first-path signal light source and a second-path signal light source;
    a plurality of optical circulators sequentially and individually connected to each of the plurality of ONUs, wherein the optical circulator in a first-order position receives the first-path signal light source transmitted by the optical splitter and transmits the first-path signal light source received from the optical splitter to the ONU in a first-order position, so as to receive a return signal transmitted by the ONU in the first-order position and then pass the return signal received from the ONU in the first-order position to the optical circulator in a second-order position, until the optical circulator in a last-order position receives the return signal transmitted by the ONU in a last-order position and transmits the return signal received from the ONU in the last-order position; and
    a colorless light source module for receiving the second-path signal light source transmitted by the optical splitter and the return signal transmitted by the optical circulator in the last-order position, and using the second-path signal light source to modulate the return signal received from the optical circulator in the last-order position to generate an upstream signal light source to be then transmitted back to the OLT by the optical splitter;
    wherein the colorless light source module comprises at least two colorless light source transceivers, a first switch and a second switch;
    wherein the first switch is connected with the two colorless light source transceivers and the optical circulator in the last-order position; and
    wherein the second switch is connected with the two colorless light source transceivers and the optical splitter.

2. The optical wavelength division node of claim 1, wherein the optical splitter is a 1-to-2 optical splitter.

3. The optical wavelength division node of claim 1, wherein each colorless light source transceiver includes two semiconductor optical amplifiers, a first optical circulator, a second optical circulator and a reflective semiconductor optical amplifier, wherein the first optical circulator is interconnected and provided between one end of the two semiconductor optical amplifiers and the second switch, the second optical circulator is connected with the other end of the two semiconductor optical amplifiers, and the reflective semiconductor optical amplifier is interconnected and provided between the second optical circulator and the first switch.

4. The optical wavelength division node of claim 1, wherein the OLT transmits and receives light sources via at least two arrayed waveguide gratings.

5. An optical wavelength division node interconnected and provided between an optical line terminal (OLT) and a plurality of optical network unit (ONU), comprising:
    a filter for receiving a downstream signal light source and a signal-free light source with different wavelengths transmitted by the OLT, and separately transmitting the received downstream signal light source and the signal-free light source received from the OLT;
    a plurality of optical circulators sequentially and individually connected to each of the plurality of ONUs, wherein the optical circulator in a first-order position receives the downstream signal light source transmitted by the filter and transmits the downstream signal light source received from the filter to the ONU in a first-order position, so as to receive a return signal transmitted by the ONU in the first-order position and pass the return signal received from the ONU in the first-order position to the optical circulator in a second-order position, until the optical circulator in a last-order position receives the return signal transmitted by the ONU in a last-order position and transmits the return signal received from the optical circulator in the last-order position; and
    a colorless light source module for receiving the signal-free light source transmitted by the filter and the return signal transmitted by the optical circulator in the last-order position, and using the signal-free light source to modulate the return signal received from the optical circulator in the last-order position to generate an upstream signal light source to be then transmitted back to the OLT by the filter;

wherein the colorless light source module comprises at least two colorless light source transceivers, a first switch and a second switch;

wherein the first switch is connected with the two colorless light source transceivers and the optical circulator in the last-order position; and wherein the second switch is connected with the two colorless light source transceivers and the filter.

6. The optical wavelength division node of claim 5, wherein each colorless light source transceiver includes two semiconductor optical amplifiers, a first optical circulator, a second optical circulator and a reflective semiconductor optical amplifier, wherein the first optical circulator is interconnected and provided between one end of the two semiconductor optical amplifiers and the second switch, the second optical circulator is connected with the other end of the two semiconductor optical amplifiers, and the reflective semiconductor optical amplifier is interconnected and provided between the second optical circulator and the optical circulator in the last-order position.

7. The optical wavelength division node of claim 5, wherein the OLT transmits and receives light sources with the optical wavelength division node via at least two arrayed waveguide gratings.

* * * * *